US008577602B2

(12) United States Patent
Walder

(10) Patent No.: US 8,577,602 B2
(45) Date of Patent: Nov. 5, 2013

(54) METHOD AND DEVICE FOR PRESENTING INFORMATION ASSOCIATED TO GEOGRAPHICAL DATA

(75) Inventor: Robert Walder, Kristianstad (SE)

(73) Assignee: Vodafone IP Licensing Limited, Berkshire (GB)

( * ) Notice: Subject to any disclaimer, the term of this patent is extended or adjusted under 35 U.S.C. 154(b) by 982 days.

(21) Appl. No.: 12/350,743

(22) Filed: Jan. 8, 2009

(65) Prior Publication Data

US 2009/0177384 A1 Jul. 9, 2009

Related U.S. Application Data

(60) Provisional application No. 61/006,371, filed on Jan. 9, 2008.

(30) Foreign Application Priority Data

Jan. 9, 2008 (EP) ..................................... 08150125

(51) Int. Cl.
*G01C 21/00* (2006.01)

(52) U.S. Cl.
USPC ............ 701/426; 701/438; 701/451; 701/461

(58) Field of Classification Search
USPC ......... 701/200, 208, 209, 212, 426, 430, 438, 701/451, 454, 461
See application file for complete search history.

(56) References Cited

U.S. PATENT DOCUMENTS

| 6,507,291 | B1 | 1/2003 | Schreiner |
| 6,542,814 | B2 | 4/2003 | Polidi et al. |
| 6,587,782 | B1 * | 7/2003 | Nocek et al. ................. 701/200 |
| 6,640,185 | B2 * | 10/2003 | Yokota et al. ................. 701/208 |
| 6,799,201 | B1 | 9/2004 | Lee et al. |
| 6,904,360 | B2 * | 6/2005 | Pechatnikov et al. ......... 701/208 |
| 7,149,625 | B2 * | 12/2006 | Mathews et al. .............. 701/209 |
| 7,155,339 | B2 | 12/2006 | Tu |
| 7,430,473 | B2 * | 9/2008 | Foo et al. ...................... 701/212 |
| 7,499,796 | B2 * | 3/2009 | Listle et al. ................... 701/200 |
| 7,538,715 | B2 * | 5/2009 | Langford et al. ............... 342/90 |
| 8,489,332 | B2 * | 7/2013 | Tomobe et al. ............... 701/533 |
| 2002/0138196 | A1 | 9/2002 | Polidi et al. |
| 2003/0229441 | A1 * | 12/2003 | Pechatnikov et al. ......... 701/201 |
| 2004/0204821 | A1 | 10/2004 | Tu |
| 2004/0254723 | A1 | 12/2004 | Tu |
| 2005/0234639 | A1 * | 10/2005 | Endo et al. .................... 701/209 |
| 2007/0219706 | A1 | 9/2007 | Sheynblat |
| 2007/0244631 | A1 * | 10/2007 | Jung et al. ..................... 701/201 |
| 2009/0281718 | A1 * | 11/2009 | Gibran et al. ................. 701/200 |
| 2009/0319175 | A1 * | 12/2009 | Khosravy et al. ............. 701/206 |
| 2010/0332324 | A1 * | 12/2010 | Khosravy et al. .......... 705/14.53 |

FOREIGN PATENT DOCUMENTS

| EP | 0 995 973 | A2 | 4/2000 |
| EP | 1 203 931 | A1 | 5/2002 |
| WO | WO-01/92827 | A1 | 12/2001 |
| WO | WO-2004/038446 | A2 | 5/2004 |

\* cited by examiner

*Primary Examiner* — Joseph C Rodriguez
(74) *Attorney, Agent, or Firm* — Birch, Stewart, Kolasch & Birch, LLP

(57) ABSTRACT

The invention relates to a method for presenting points of interest (POIs) via a graphical user interface (GUI) on an apparatus. Generally, data is received via a global positioning system (GPS) and map data is received via a communications network. Next, a reference location is determined, and based on the reference location a search area is determined. Next, POIs are found within said search area, wherein said reference location is comprised within said search area, and then said POIs are organized in a multilevel hierarchy tree. Finally, the found POIs are presented on the GUI.

19 Claims, 7 Drawing Sheets

METHOD AND DEVICE FOR PRESENTING INFORMATION ASSOCIATED TO GEOGRAPHICAL DATA

This Nonprovisional application claims priority under 35 U.S.C. §119(e) on U.S. Provisional Application No. 61/006,371 filed on Jan. 9, 2008 and 35 U.S.C. §119(a) on Patent Application No(s). 08150125.6 filed in Europe on Jan. 9, 2008, the entire contents of which are hereby incorporated by reference.

TECHNICAL FIELD

The invention generally relates to a method for presenting points of interest (POIs) via a graphical user interface (GUI) of an apparatus, a device for processing map data, a system for handling points of interests (POIs) and a computer program product.

BACKGROUND OF THE INVENTION

Today, navigation systems have become very popular and a number of different types of navigation systems are marketed, e.g. car navigation systems and handheld navigation systems. By utilising a navigation system, a current position as well as directions to a target position may be provided to the user, which implies that the user easily can find out where he is and how to get to a desired position.

Apart from finding out the current position and how to get to a desired position, points of interests (POIs) may be added to the map utilised by the navigation system. By utilising the POIs, the navigation system may be used not only to find a specific target position, but also to find, for instance, the nearest hotel.

Although a number of navigation systems utilising POIs have been introduced on the market, the user interface of these may be improved, and more specifically a more intuitive and user friendly navigation system may be provided. Moreover, the information handling of the navigation systems may be improved as well.

SUMMARY

In view of the above, an objective of the invention is to solve or at least reduce the problems discussed above. In particular, an objective is to present points of interest (POIs) via a graphical user interface (GUI), wherein the presented POIs are chosen on the basis of a reference location, such as the point of self location.

Generally, an advantage is that relevant POIs may be presented to the user with less user interaction, which implies higher efficiency and an improved user interface.

According to a first aspect a method for presenting points of interest (POIs) via a graphical user interface (GUI) of an apparatus is provided. The method comprises determining a reference location, determining a search area based on said reference location, finding POIs within said search area utilising map data, organizing said POIs in a multilevel hierarchy tree, thereby enabling dynamic presentation of POIs present within said search area.

The reference location may be comprised within the search area.

The presentation of POIs may be automatic, i.e. as soon as a new reference location is detected a new set of POIs is generated and presented to the user. In other words, the POIs presented on the GUI may change when the reference location moves from one location to another location. Hence, the POIs presented on the GUI may change without any user interaction.

The reference location may be a location of the apparatus determined by using data from a global positioning system.

Optionally, said method may further comprise receiving data via a global positioning system, also referred to as GPS data, and wherein said reference location may be determined using said received GPS data.

Optionally, the points comprised within said search area may constitute a convex set. For example, the search area may have a circular shape as illustrated in FIG. 8.

Optionally, a size of said search area may be dependent of way of transportation. The way of transportation may be entered by the user or automatically detected by first determining the velocity and then classifying way of transportation based on the determined velocity.

Optionally, the size of said search area may be dependent of a velocity with which said apparatus is moved. The velocity may be determined by using the data received via said GPS. For example, one way of adjusting the size of the search area is to adjust a length of a radius of the search area in accordance to the velocity.

Additionally, the shape of the search area may be determined on the basis of the velocity. For example, as illustrated in FIG. 9, the shape of the search area may be adjusted in accordance to the velocity such that the main part of the search area is placed in an area lying ahead of the user. An advantage of this is that the POIs presented on the GUI may be limited to POIs which the user travels towards. Optionally, the step of finding POIs within said search area and said step of organizing said POIs may be automatically performed after a search area change. In other words, when a new reference location is determined the presented POIs may be updated.

Optionally, a number of levels of said multilevel level hierarchy may be adjustable. The number of levels may automatically be adjusted when the size of the search area is changed. In one embodiment, the number of levels may be increased when the size is increased. For example, if a user is searching for a restaurant using a large search area, a large number of restaurants may be found. In order to organize this large number of restaurants in a handy way an increased number of levels may be used.

The number of levels may be adjusted automatically. For example, the number of levels may be adjusted depending on the number of POIs.

Optionally, distances may be presented in association to said POIs.

Optionally, the size of said search area may be adjusted via a slider bar in said GUI.

Optionally, the method may further comprise determining a cache area, wherein said cache area comprises said search area, receiving cache map data corresponding to said cache area, and storing said cache map data.

If GPS data is downloaded continuously, an advantage of using the cache area is that the data handling of the apparatus is made more efficient, which in turn implies that a faster and more efficient navigation system is provided.

According to a second aspect a device for processing map data is provided. The device may comprise a graphical user interface (GUI), a reference location determinator adapted to determine a reference location, a search area determinator adapted to determine a search area based on said reference location, a point of interests (POI) determinator adapted to determine POIs within said search area utilising map data, a POI organizer adapted to organize said POIs in a multi-level tree hierarchy, thereby enabling dynamic presentation of POIs present within said search area via said GUI.

Optionally, said device may further comprise a receiver adapted to receive GPS data, and said reference location determinator may be adapted to determine said reference location based on said received GPS data.

The device may further comprise a receiver adapted to receive map data. The same receiver may be used to receive GPS data and map data.

Further, the device may comprise a memory adapted to store map data. The map data may be downloaded and/or updated via a communications network, or other network suitable for data communication. Alternatively, the map data may be pre-stored on the memory.

Optionally, the device may further comprise a user input receiver adapted to receive user input data.

Optionally, the user input receiver may be adapted to receive a user set reference location, and said reference location determinator may be configured to set said reference location as said user set reference location.

Optionally, the user input receiver may be adapted to receive search area conditions, and said search area determinator may be configured to determine said search area based on said search area conditions.

Optionally, the user input receiver may be adapted to receive POI organization conditions, and said POI organizer may be configured to organize said POI output data based on said POI organization conditions.

Optionally, said search area determinator may comprise a velocity determinator configured to determine a velocity with which said device is moving, and said search area determinator may be configured to determine said search area based on said determined velocity.

According to a third aspect of the invention a system for handling points of interests (POIs) is provided. The system comprises a communications network, a device as described above connected to said communications network, and a number of databases containing map data connected to said communications network, wherein said databases are configured to communicate with said device via said communication networks.

According to a fourth aspect a computer program product is provided. The computer program product comprises software instructions that, when stored on a computer-readable medium and executed in an apparatus, such as a mobile communication terminal, performs the method according to the above mentioned method.

The wording "Global Positioning System (GPS)" is to be interpreted widely as a system that transmits position data to an apparatus.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein.

DETAILED DESCRIPTION OF PREFERRED EMBODIMENTS

Figure 1:
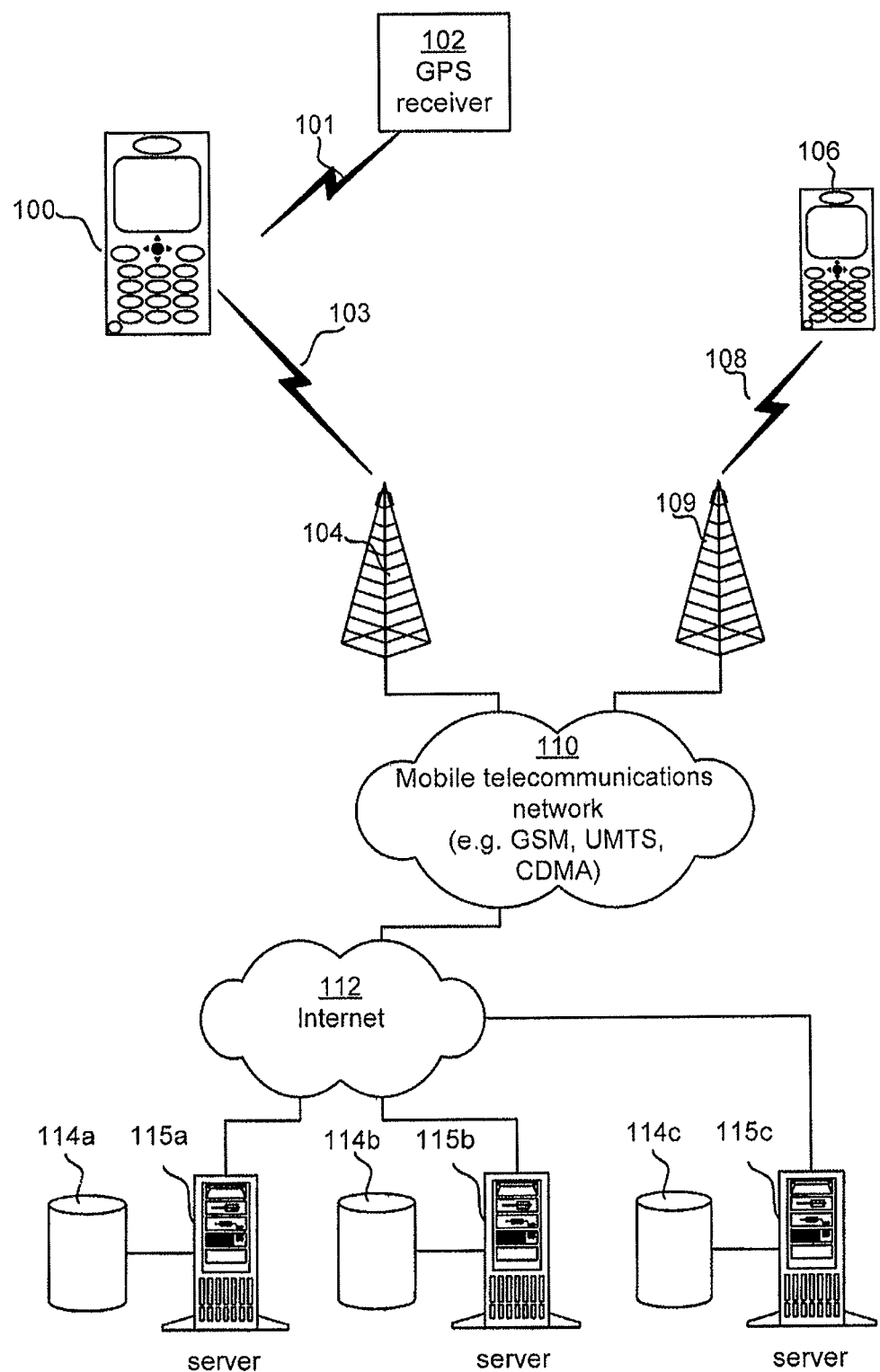
FIG. 1 is a schematic illustration of a system for searching among and presenting information associated with geographical position data.

FIG. 1 is a schematic illustration of a system for searching among and presenting information associated with geographical position data.

A mobile communication terminal 100 can be adapted to receive GPS data 101 from a GPS receiver 102, which in turn may be adapted to receive GPS data from a GPS satellite (not shown). The mobile communication terminal 100 may further be adapted to receive map data 103, which may be transmitted to the mobile communication terminal 100 from a base transceiver station (BTS) 104 via wireless data communication.

Alternatively, a mobile communication terminal 106 may include a GPS receiver, which means that the GPS data may be transmitted directly to the mobile communication terminal 106. Map data 108 may be transmitted to the mobile communication terminal 106 from a base transceiver station (BTS) 109 via wireless data communication.

The wireless data communication may be enabled by using a Mobile telecommunications network 110, such as GSM, UMTS, CDMA or any other standard suitable for transmission of data to a mobile communication terminal. The mobile data communications network 110 may, in turn, communicate, e.g via Internet 112, with a number of servers 114a-114c. The servers 114a-114c may be connected to databases 115a-115c containing i.a. map data.

The wording map data is to be interpreted widely as data containing geographic information. For example, the map data may contain data needed to display the map on the GUI, satellite images, POIs, such as restaurants, bars, hotels and sights, and images related to specific places. Moreover, the map data may contain POI specific information, such as the opening hours for a museum or special offers for a restaurant.

Apart from stationary objects and additional information, the map data may include moveable objects, such as other mobile communication terminals. The information about these moveable objects may be transmitted to the databases 114a-114c via the mobile communications network 110.

The moveable objects may also include cars, buses, taxis and other means of transportation. In order to keep track of this type of moveable objects, on-board transmitters sending out the present location may be utilised.

Figure 2:
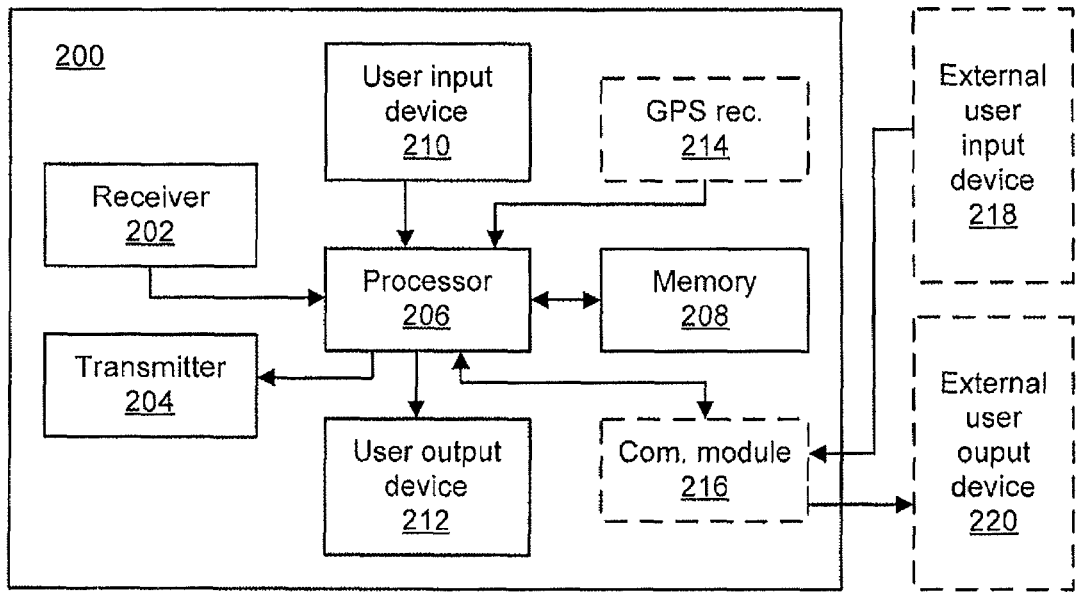
FIG. 2 is a schematic illustration of an apparatus configured to present POIs via a GUI.

FIG. 2 is a diagrammatic illustration of an apparatus 200 for presenting map data. The apparatus 200 may comprise a receiver 202 for receiving data, such as GPS data, map data, audio data, video data, and a transmitter 204 for transmitting data. Further, the apparatus 200 may comprise a processor 206 and a memory 208, which are configured to process said data.

Alternatively, instead using one and the same receiver 202 for receiving GPS data and map data, a GPS data receiver and a map data receiver may be utilised.

The apparatus 200 may comprise a user input device 210, such as a microphone and/or a keyboard, and a user output device 212, such as a loudspeaker and/or a display.

Optionally, the apparatus 200 may comprise a GPS receiver 214 adapted to receive GPS data. In this case, if the apparatus comprises the GPS receiver 214, the receiver does not need to be configured to receive GPS data.

An advantage of having a built-in GPS receiver is that only one device is needed, as illustrated in FIG. 1.

Alternatively, instead of incorporating the GPS receiver within the apparatus, an external GPS receiver may be used. An advantage of having an external GPS receiver can be that the external GPS receiver may placed in such a way that the level of signal reception is high at the same time as the apparatus may be placed in such a way that the user easily can view the display.

Optionally, the apparatus 200 may comprise a communication module 216, such as a Bluetooth™ module. By utilising this module, the apparatus may communicate with an external user input device 218 and/or an external user output device 220.

The map data may be stored in a memory in the apparatus 200. This memory may be a dedicated memory for storing map data or the memory 208. The memory may comprise pre-stored map data.

Map data may be downloaded or updated via a mobile communications network. Alternatively, the memory holding the map data may be replaced by another memory holding another version of map data. Further, the map data may be downloaded and/or updated by using a computer linked to the apparatus via a wired or wireless data link.

Figure 3:
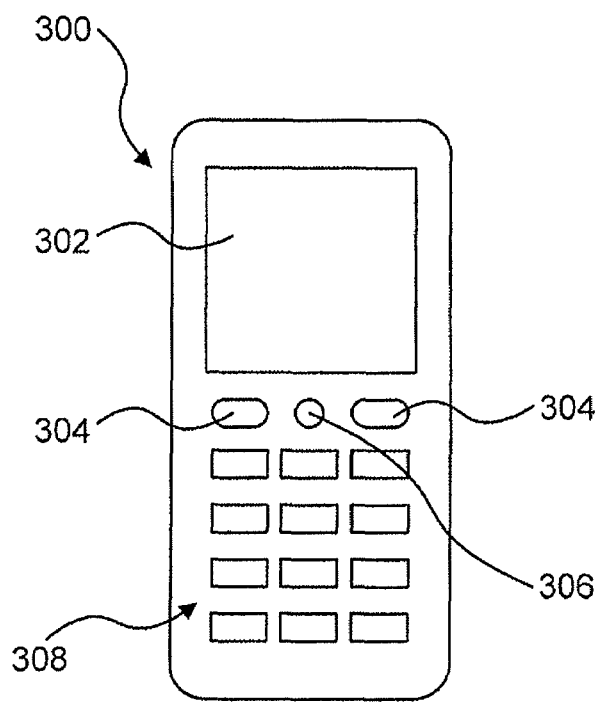
FIG. 3 schematically illustrates a mobile communication terminal.

FIG. 3 schematically illustrates a mobile communication terminal 300, which is one embodiment of the apparatus. The mobile communication terminal 300 may comprise a display 302, soft buttons 304, a joystick 306 and a keyboard 308. Further, the mobile communication terminal may comprise a microphone (not shown) and a loudspeaker (not shown).

Figure 4:
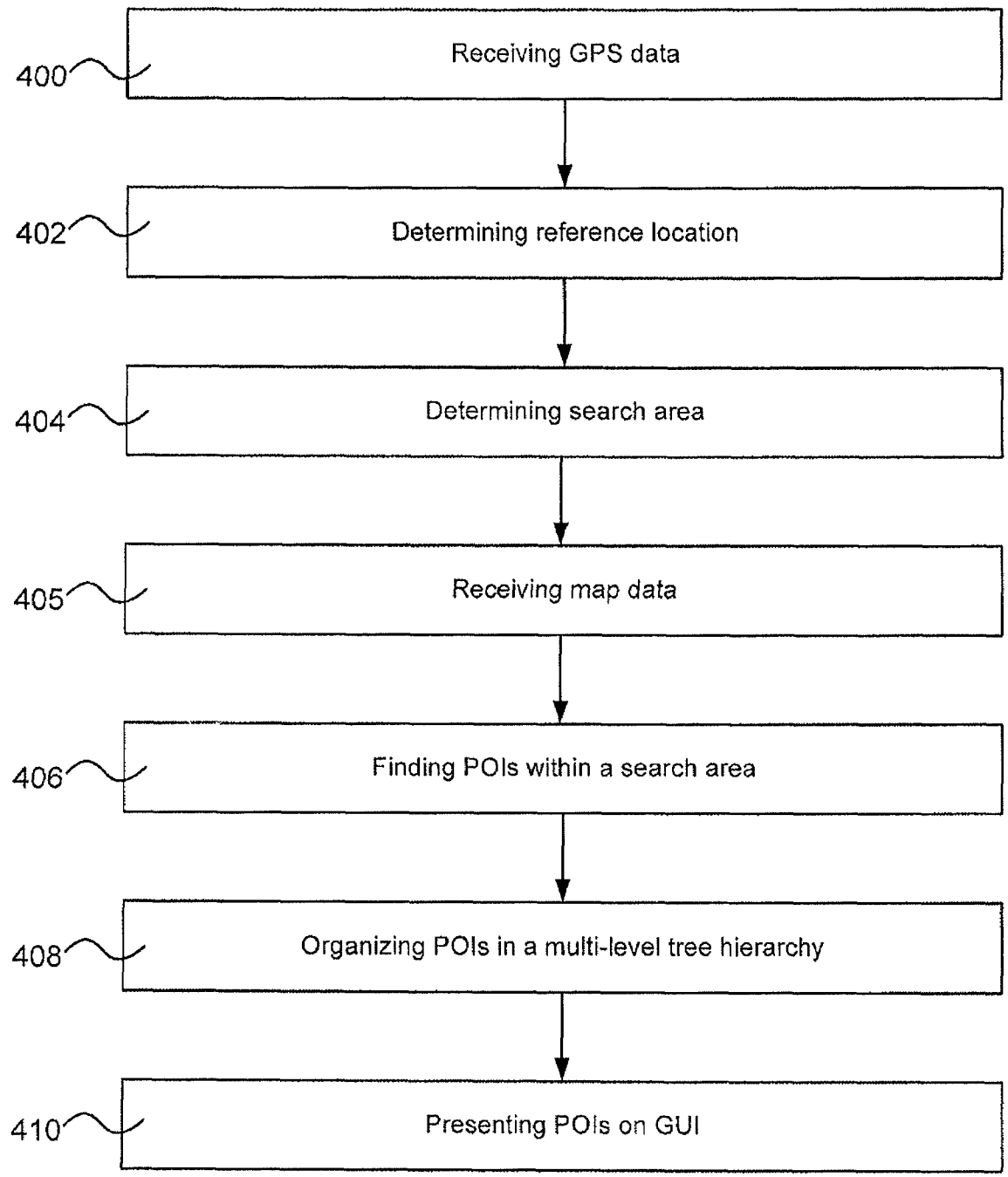
FIG. 4 is a flow chart of an embodiment of a method for presenting points of interest (POIs) via a graphical user interface (GUI).

FIG. 4 is a flow chart illustrating a method for presenting points of interest (POIs) via a graphical user interface (GUI).

In a step 400, GPS data can be received from a global positioning system (GPS).

In a step 402, a reference location, such as a self location, may be determined. The reference location may be determined based on the GPS data received from the GPS, but the reference location may also be determined by the user himself or by an external application. For instance, if a user would like to investigate the POIs close to a specific place, he may enter the GPS data for this specific place as his reference location.

In a step 404, a search area may be determined. The search area may be determined based on the reference location. Further, the search area may comprise the reference location. The size of the search area may be chosen in such a way that POIs within the search area are relevant for the user. For instance, if a user is walking in a big city and he is interested to find restaurants, the search area may be set to include only the closest blocks, but, on the other hand, if the user is travelling by car, the search area may be set to include the closest kilometers.

The size of the search area may be set by the user himself or automatically by a software application. Further, the shape of the search area may be set by the user or automatically by the software application.

Figure 9:
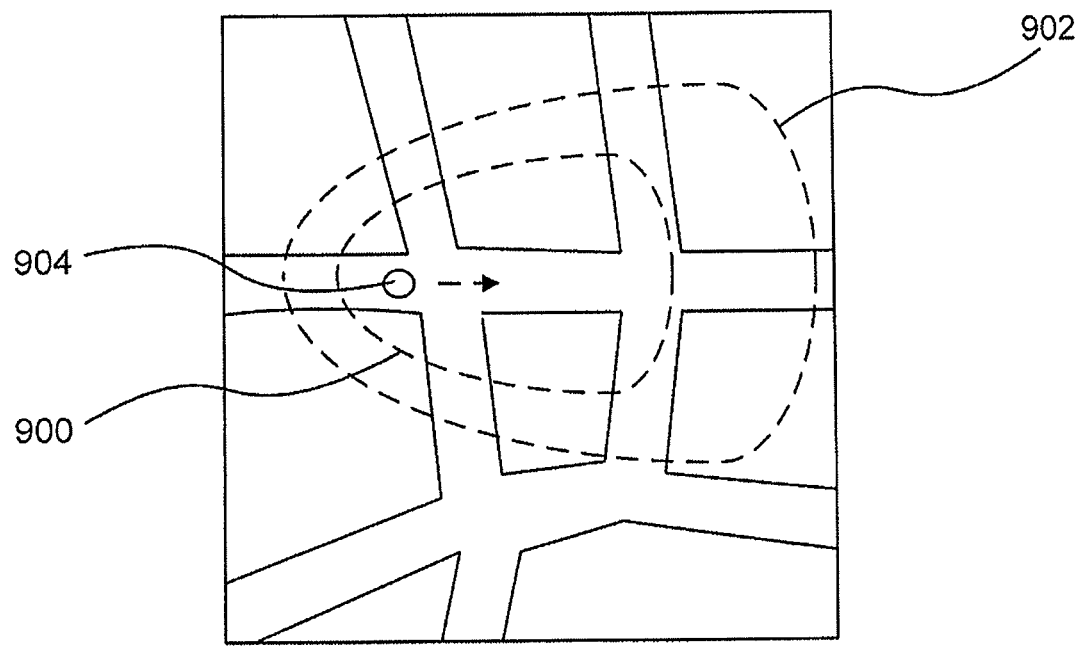
FIG. 9 illustrates a search area and an associated cache area according to another embodiment of the present invention, wherein the shape of the search area and the shape of the associated cache area depends on the velocity of the apparatus.

The software application may take the velocity with which the apparatus is moving into account when determining the size and/or shape of the search area. For instance, if the apparatus is moving with a high velocity, the size of the search area may be increased to a large sized search area, and, on the contrary, if the apparatus is moving with a low velocity, the size of the search area may be decreased to a small sized search area. Moreover, if the apparatus is moving with a high velocity the shape of the search area may be set to a shape that is suitable for this circumstance. For instance, if a person having an apparatus, as described above, is travelling by car, the apparatus will be detected to move with a high velocity, and based upon this detection a shape of the search area that has an emphasis on the area in front of the travel direction can be chosen, e.g. as is illustrated in FIG. 9. In this particular example, the decision is based on the presumption that POIs in the travel direction are most relevant to the user.

In a step 405, map data can be received. The map data may contain data needed to display the map on the GUI, satellite images, POIs, such as restaurants, bars, hotels and sights, and images related to specific places. Moreover, the map data may contain POI specific information, such as the opening hours for a museum or special offers for a restaurant.

In a step 406, POIs within the search area can be found.

The POIs may be organized in different categories, such as restaurants, hotels, bars, sights etc. Further, the POIs may include other apparatuses, which may be added as friends, and moveable objects, such as taxis and buses.

Figure 7C:
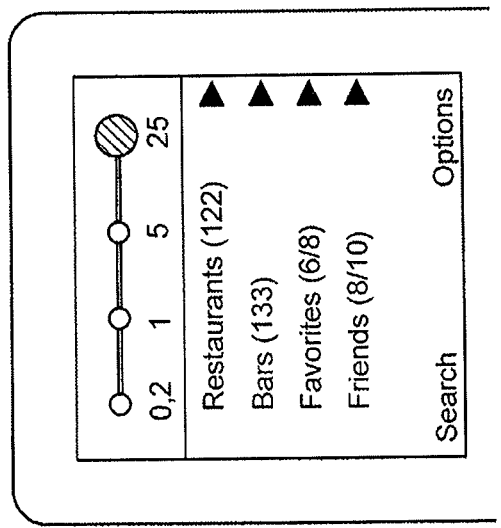
FIG. 7a-7c illustrates an example of how a user may find out the number of restaurants, bars, favorites and friends at different distances.
Figure 7B:
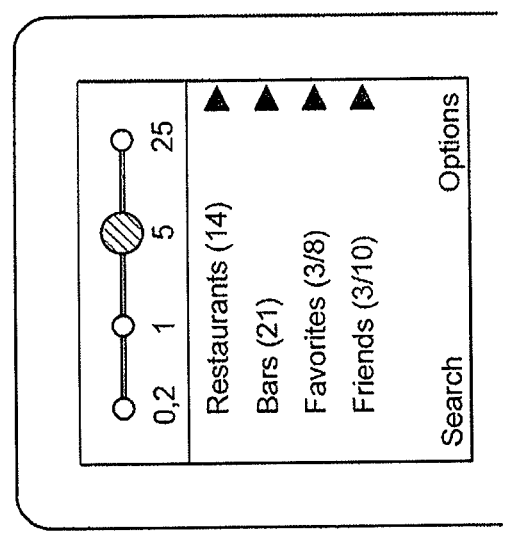
Figure 7A:
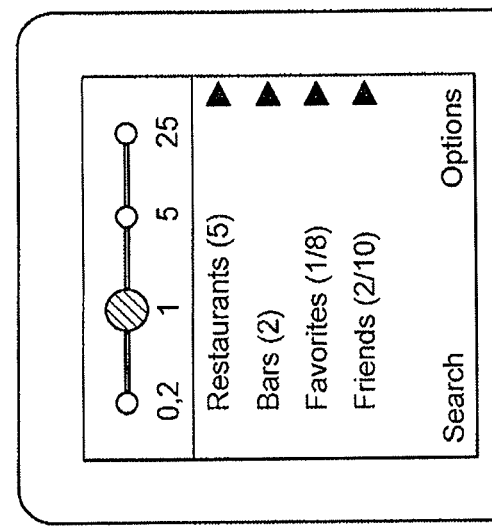

In a step 408 the found POIs can be organized in a multi-level hierarchy tree. An advantage of having the result shown in a multi-level hierarchy tree is that it is easy for the user to get a good view of the result. An example of a GUI based on a multi-level hierarchy tree is illustrated in FIG. 7a-7c.

In a step 410, the found POIs can be presented on the apparatus via a GUI. An example of the GUI is presented in FIG. 6a-6e as well as FIG. 7a-7c.

Figure 5:
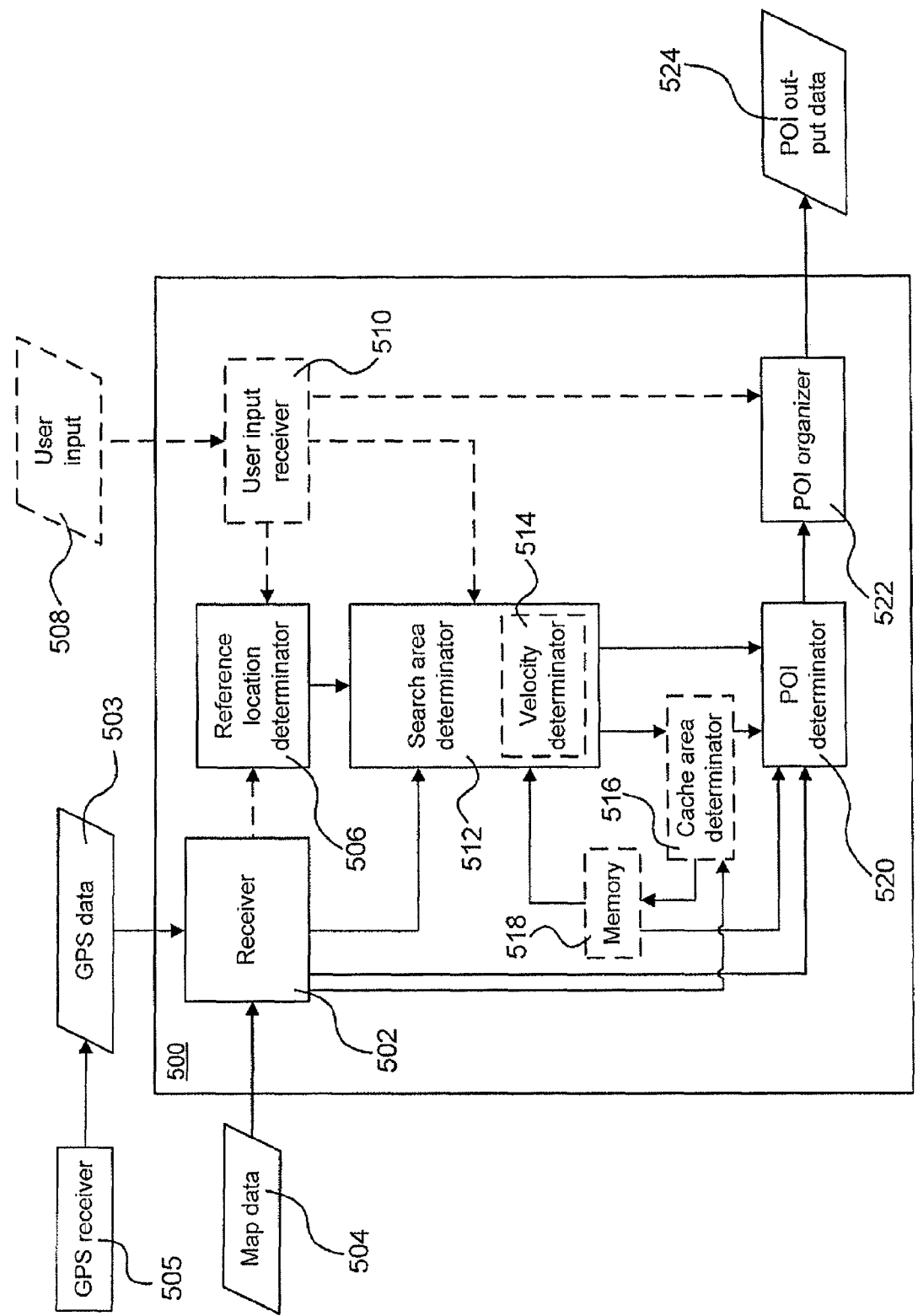
FIG. 5 is a schematic illustration of a device for processing map data according to the present invention.

FIG. 5 is a schematic illustration of a device 500 according to the present invention. The device may be embodied as a control unit, such as an ASIC, or as a software application.

The device 500 may comprise a receiver 502, which receiver 502 can be adapted to receive GPS data 503 and map data 504. The map data 504 can be transmitted from a server as illustrated in FIG. 1, and the GPS data can be transmitted from a GPS receiver 505. As is illustrated in FIG. 5, the GPS receiver can be an external device, but the GPS receiver 505 may also, in an alternative embodiment, be comprised within the device 500.

Alternatively, instead of using one receiver 502 for receiving GPS data as well as map data, a GPS data receiver and a map data receiver may be used.

In one embodiment the GPS data 503 may be transferred to a reference location determinator 506 in which a reference location may be determined.

In another embodiment a reference location may be determined based on user input 508 transferred to the reference location determinator 506 via a user input receiver 510.

In still another embodiment the reference location can be determined based on the GPS data if no user input has been received, e.g. in the absence of a user input reference location, a self location is determined automatically by utilising the GPS data and thereafter the self location is set as the reference location.

The reference location can be input to a search area determinator 512. Based on the map data and the reference location the search area determinator 512 can determine a search area. The shape and size of the search area may be chosen according to preset conditions, or based on user set conditions provided to the search area determinator 512 via the user input receiver 510.

Optionally, a velocity determinator 514 may be utilised in order to determine a velocity with which the device is moving. The velocity may e.g. be determined by dividing a distance between two self locations, determined by utilising received GPS data, with a time between said two self locations. The determined velocity may be utilised to determine the size of the search area, e.g. if the search area is shaped as a circle, a high velocity may result in a long radius. Moreover, the velocity may be used to determine the shape of the search area, e.g. a main part of the search area may be placed in the direction of travel.

Optionally, in order to improve the data handling a cache area may be determined by a cache area determinator 516. The cache area can be larger than the search area, which has the positive effect that a minor amount of data or no data at all has to be downloaded upon a small change of the search area, which in turn implies a faster response to the user of the apparatus.

In order to enable this cache area functionality a memory 518 can be associated to the cache area determinator 516. In this memory 518, the map data associated to the cache area is stored, and if a small change of the search area is detected this cache area data may be transferred to the search area determinator 512.

A POI determinator 520 can be adapted to determine POIs within the search area determined by utilising the search area determined by the search area determinator 512 and the map data 504. The determined POIs are organized, e.g. in multilevel tree hierarchy, by using a POI organizer 522. The organized POIs can then be output from the POI organizer as POI output data 524. The POI output data 524 may be transferred to a GUI configured to present POI output data 524.

FIG. 6a-6e illustrates an example of how a user may find a restaurant close to his position using a software application based on an embodiment of the method according to the present invention. This particular example is intended for a mobile communication terminal.

Figure 6C:
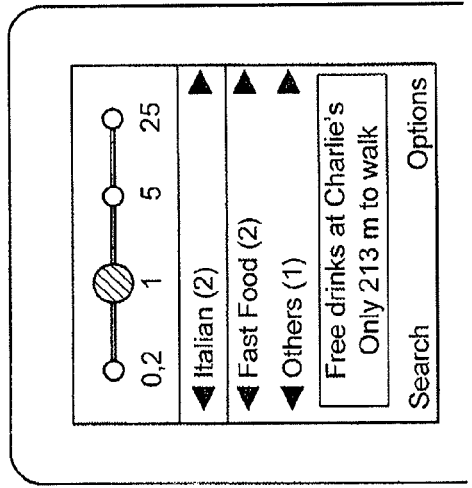
FIG. 6a-6e illustrates an example of how a user may find a restaurant close to his position using a software application based upon an embodiment of the method according to the present invention.
Figure 6B:
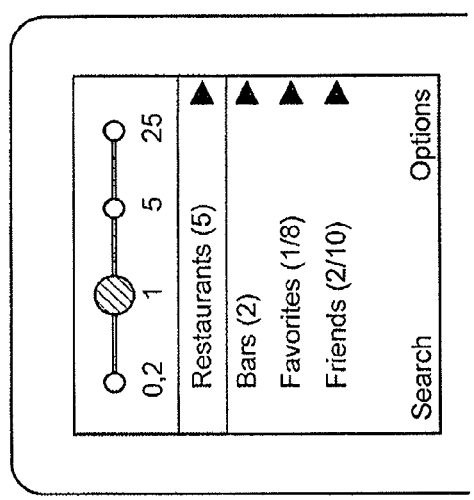
Figure 6A:
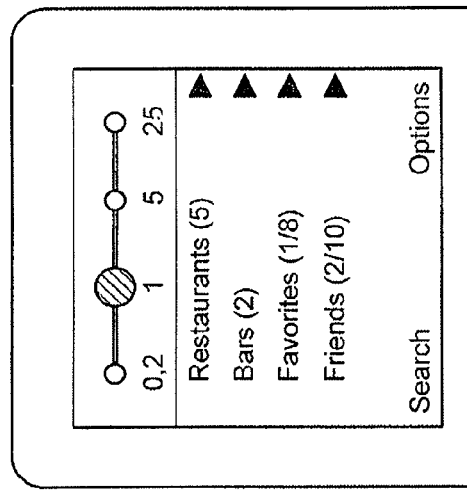

In a first step, illustrated in FIG. 6a, a size of the search area is chosen. The size of the search area can be determined by choosing an appropriate radius. A chosen radius is in this example indicated as a larger and shaded circle and the other alternatives are indicated as smaller and non-shaded circles. In order to switch between different radii a joystick (not shown) may be used.

In a second step, illustrated in FIG. 6b, a category, or in other words highest level, of POIs is chosen. In this particular example the category "Restaurants" is chosen. The number of POIs corresponding to this category may be indicated in association to the categories. In this example it is indicated to be five.

In a third step, illustrated in FIG. 6c, it is shown that the five restaurants are in turn divided into three sub-categories, namely "Italian", "Fast food" and "Others" of which there are two, two and one, respectively. Moreover, it may be possible to change the radius at this stage if the number of POIs are considered too large or too small. In this example the "Italian" sub-category is chosen.

Further, information from a nearby POI may be added. In this particular example the added information is an advertisement from a bar called "Charlie's". In order to make the added information, such as advertisement, more interesting map data related information may be added. In this particular example, the distance to the bar "Charlie's" has been added. Other information, such as directions, may be added as well.

It is also possible to set up map data related advertisement conditions. For instance, a company buying advertisement spots may set up a condition that their advertisement is to be shown to users being in an advertisement area of this company. For example, the owner of "Charlie's" may set up the condition that the advertisement is to be shown to users being closer than 500 m from the bar. By setting up this type of conditions it is also possible to charge advertising companies based on shown ads, advertisement area size, etc. Further, directions may be shown to the user if the user clicks on the advertisement. This further implies that advertising companies may be charged based on number of clicks, or number of shown directions.

Figure 6E:
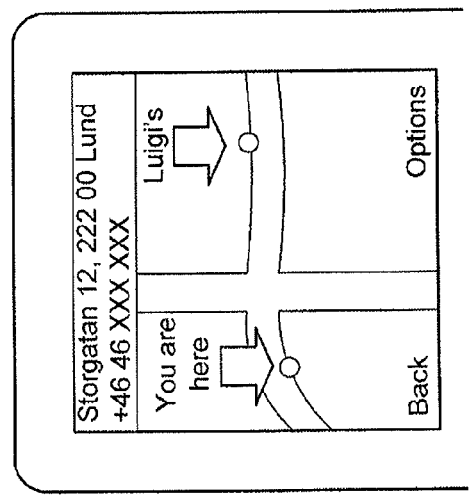
Figure 6D:
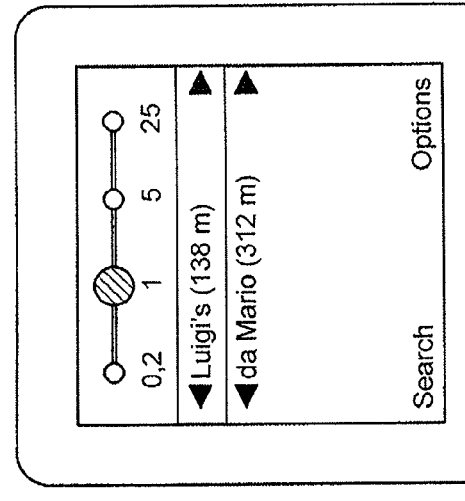

In a fourth step, illustrated in FIG. 6d, the two Italian restaurants is shown, named "Luigi's" and "da Mario". In this step the distances to the restaurants may be shown in association to the names of the restaurants. In the example the distance to Luigi's is 138 m and the distance to da Mario is 312 m. In this example the Italian restaurant named Luigi's is chosen.

In a fifth step, illustrated in FIG. 6e, a map presenting the current position and the position of "Luigi's" is shown. Alternatively, instead of showing a map with the current position and the target position marked, a directions guide may be started. For example, a directions guide may give instructions step by step as the user comes close to the target position.

FIG. 7a-7c illustrates an example of how a user may find out the number of restaurants, bars, favorites and friends at different distances using a software application based on an embodiment of the method as described above.

In a first step, illustrated in FIG. 7a, a number of POIs, in this example restaurants, is presented on the GUI. In this particular example the search area is a circle and the search area is changed by changing the length of the radius. In this first step the radius is set to 1 km, which is indicated by a large and shaded circle.

In a second step, illustrated in FIG. 7b, the radius of the search area is changed from 1 km to 5 km, which implies that the number of POIs are increased. For example, the number of restaurants is increased from five to fourteen, the number of bars is increased from two to twenty-one, and so on.

In a third step, illustrated in FIG. 7c, the radius is increased to 25 km, which gives an even greater number of POIs. For example, the number of restaurants is increased to 122, the number of bars is increased to 133, and so on.

In this example the search area is changed at the highest level of POIs, but the search area may also be changed at lower levels of POIs.

Figure 8:
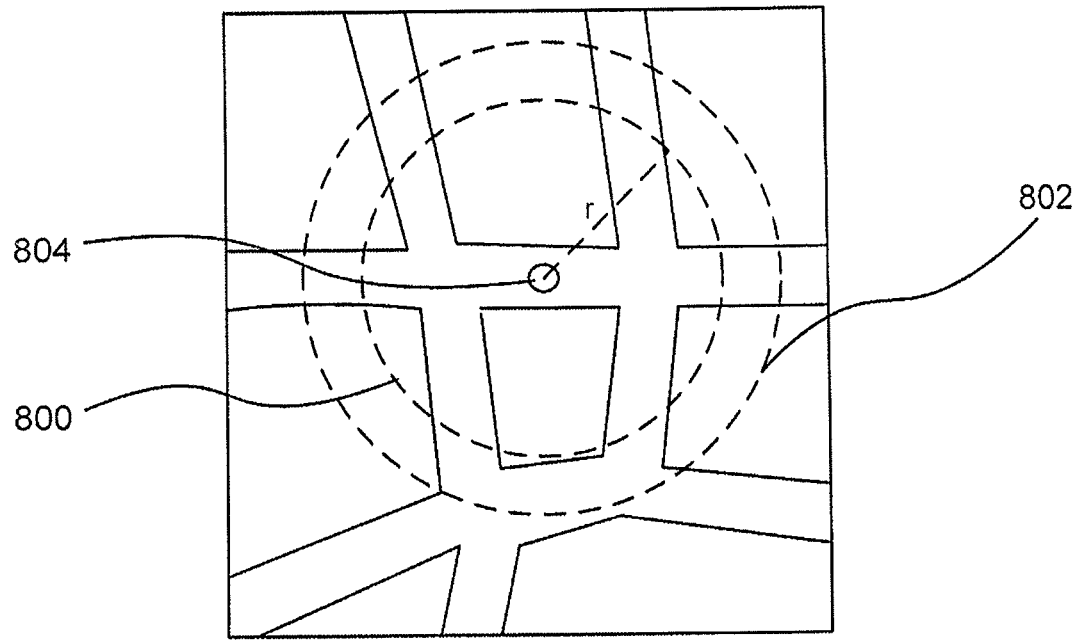
FIG. 8 illustrates a circular search area and an associated cache area according to one embodiment of the present invention.

FIG. 8 illustrates an example of a search area 800 and an associated cache area 802 according to one embodiment of the present invention. In this example the search area 800 is shaped as a circle, wherein the center of the circle is a reference location 804.

The function of the cache area 802 is to improve the data handling efficiency of the apparatus. This may be achieved by downloading POIs within the cache area 802 to the apparatus, which implies that a small movement of the search area 800 does not result in that new map data has to be down-loaded. The positive result of this is that a faster and more efficient navigation system may be provided.

The size of the cache area 802 may depend on the size of the search area 800, and/or the velocity with which the apparatus is moving and/or a memory capacity of the apparatus.

FIG. 9 illustrates another example of a search area 900 and an associated cache area 902, wherein a reference location 904 can be comprised within the search area 900. In this example the shape of the search area 900 is adjusted in accordance to the velocity, which is indicated by an arrow.

In this example, as the velocity changes the size and shape of the search area 900 and cache area 902 can be changed. For instance, if the size of the velocity increases the search area and/or the cache area may be enlarged. Moreover, if the direction of the velocity changes the shape and/or direction of the search area 900 and/or the cache area 902 may be changed as well. Further, it is possible to take the movement history and/or prior determined velocities into account when determining the size and the shape of the search area 900 and the cache area 902.

Optionally, the amount of free memory may also be taken into account when determining the size and/or shape of the cache area 902. For example, if a large amount of free memory is available the size of the cache area may be increased.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for presenting points of interest (POIs) via a graphical user interface (GUI) of an apparatus, said method comprising
    determining a reference location,
    determining a search area based on said reference location,
        finding POIs within said search area utilising map data, said map data comprising cache map data,
    organizing said POIs in a multilevel hierarchy tree,
    determining a velocity of said apparatus,
    determining a cache area based on said velocity, wherein said cache area is larger than said search area,
    receiving said cache map data corresponding to said cache area,
    storing said cache map data, and
    thereby enabling dynamic presentation of POIs present within said search area via said GUI.

2. The method according to claim 1, further comprising receiving data via a global positioning system, and
wherein said reference location is determined using said received data.

3. The method according to claim 2, wherein points comprised within said search area constitute a convex set.

4. The method according to claim 1, wherein points comprised within said search area constitute a convex set.

5. The method according to claim 1, wherein a size of said search area is dependent of way of transportation.

6. The method according to claim 1, wherein the size of said search area is dependent of a velocity with which said apparatus is moved.

7. The method according to claim 1, wherein said step of finding POIs within said search area and said step of organizing said POIs are automatically performed after a search area change.

8. The method according to claim 1, wherein a number of levels of said multilevel level hierarchy is adjustable.

9. The method according to claim 1, wherein distances are presented in association to said POIs.

10. The method according to claim 1, wherein the size of said search area is adjustable via a slider bar in said GUI.

11. The method according to claim 1, wherein said cache map data comprises said search area.

12. A device for processing map data, comprising
    a graphical user interface (GUI),
    a reference location determinator adapted to determine a reference location,
    a search area determinator adapted to determine a search area based on said reference location,
    a velocity determinator adapted to determine a velocity of said device,
    a cache area determinator adapted to determine a cache area based on said velocity, wherein said cache area is larger than said search area,
    a memory adapted to store cache map data,
    a point of interests (POI) determinator adapted to receive said cache map data and to determine POIs within said search area utilising map data, said map data comprising said cache map data,
    a POI organizer adapted to organize said POIs in a multilevel tree hierarchy,
    thereby enabling dynamic presentation of POIs present within said search area via said GUI.

13. The device according to claim 12, further comprising a receiver adapted to receive data from a global positioning system, and wherein said reference location determinator is adapted to determine said reference location based upon said received data.

14. The device according to claim 12, further comprising a user input receiver adapted to receive user input data.

15. The device according to claim 14, wherein said user input receiver is adapted to receive a user set reference location, and said reference location determinator is configured to set said reference location as said user set reference location.

16. The device according to claim 14, wherein said user input receiver is adapted to receive search area conditions, and said search area determinator is configured to determine said search area based on said search area conditions.

17. The device according to claim 14, wherein said user input receiver is adapted to receive POI organization conditions, and said POI organizer is configured to organize said POI output data based on said POI organization conditions.

18. The device according to claim 12, wherein said search area determinator is configured to determine said search area based on said determined velocity.

19. A system for handling points of interests (POIs), said system comprising
    a communications network,
    a device according to claim 12 connected to said communications network, and
    a number of databases containing map data connected to said communications network, wherein said databases are configured to communicate with said device via said communication networks.

* * * * *